UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

BRIQUETING PROCESS.

1,246,807.   Specification of Letters Patent.   Patented Nov. 13, 1917.

No Drawing.   Application filed May 2, 1917. Serial No. 165,855.

*To all whom it may concern:*

Be it known that I, CARLETON ELLIS, a citizen of the United States, and a resident of Montclair, in the county of Essex and State of New Jersey, have invented certain new and useful Improvements in Briqueting Processes, of which the following is a specification.

This invention relates to a process of making briquets and other solid or plastic bodies, such as molded articles of various sorts, flooring compounds, artificial stone, columns, and the like, and involves the use of a solution prepared by dissolution in water of concentrated sulfite cellulose waste liquor solids, preferably of a substantially water-soluble character and preferably prepared by drying the waste liquor, preferably by atomization, yielding a binding agent or solution of a binding agent, which is incorporated with what is herein termed a bulking material, namely, the powdered or fragmentary material which is to be bound together, such as coal dust or fines, culm, sawdust, mineral fillers, talc, magnesite, crushed rock, sand, fiber, asbestos, and the like. With this material, there may be incorporated, if desired, a precipitant or coagulating agent, quick lime or hydrate of lime, being suitable in many instances, and in molding or shaping the mass as desired, in the case of briquets preferably under considerable pressure forming masses of definite shape and in subjecting the mass to suitable conditions to transform the soluble solids into a sufficiently or substantially insoluble product to meet the requirements of the uses of the article in question, such transformation being readily carried out in many cases as indicated by the use of a calcareous precipitant. My invention further comprises a binding agent consisting of a solution made from sulfite cellulose waste liquor solids which have preferably been dried preferably by atomization, preferably to form a pulverulent body, which preferably is of an acid character, as may be obtained by drying an acid form of sulfite cellulose waste liquor, and my invention further embraces as a new product, a mass of bulking material bound by coagulated sulfite cellulose waste liquor solids, coagulated from a solution of a concentrate, preferably a dry pulverulent concentrate of such solids.

I have found that the concentrated liquor especially the more acid types of the sulfite waste liquor are capable of being precipitated by lime to form a substantially insoluble body, so far as this art is concerned, and which enable briquets to be prepared which resist the disintegrating effects of water to the degree desired. It is of course somewhat remarkable that sulfite waste liquor consisting so largely of lime compounds should be precipitated by quicklime or hydrated lime, but such is the case, especially with the slightly acid varieties of the liquor. The liquors obtained from raw materials containing a rather high percentage of magnesia are preferable.

In carrying out the method I may for example take sulfite liquor preferably of an acid character, such as may be made by concentrating in an acid condition or partially neutralized state, or by acidifying the neutral concentrate. I do not mean to exclude the neutral or alkaline, or hydrolyzed, or other forms or derivatives of sulfite waste liquor or spruce or other cellulose liquors of a substantially equivalent character from the viewpoint of the present invention. The liquor is mixed with the materials to be bound together as coal dust or fines, culm, sawdust, mineral fillers, talc, magnesite, crushed rock, sand, fiber, asbestos, and the like, and then caustic lime in a finely divided condition may be admixed therewith. Reaction takes place almost immediately with some liquors and the insoluble compound is formed in and around the filling material. Sometimes the reaction is not immediate especially when the sulfite liquor is diluted with 20 to 50% of water or when the sulfite liquor solids are because of the nature of the concentration in a less unstable condition. Thus in various ways the setting time may be controlled so that opportunity is afforded to work the plastic into suitable shape after mixing. Hydrated lime works usually a little slower than quicklime. About 50% of lime reckoned on the weight of sulfite liquor of 30° Bé. is a satisfactory amount of precipitant. 30% and even less will serve but the setting time is greatly protracted, which of course for some purposes may not be undesirable. From 30–50% is however recommended for general operation. This may be exceeded in some cases.

In preparing a briquet from culm or coal material of various sorts, the sulfite liquor solution prepared by dissolving preferably sulfite liquor solids which have been dried by atomization, is incorporated with the bulking material, and if desired, caustic lime in a fine powder may then be admixed, the shaping into briquets following as soon as possible. If preferred, hydrated lime, either in dry form or as a paste such as milk of lime may be introduced with the ingredients and the mixture pressed into briquet form as promptly as possible.

On the weight of the coal employed from 6 to 10 per cent. of sulfite liquor may be used, the proportion varying between these or other limits according to the character of the coal amount of briqueting pressure and so forth. The coal particles need not be uniformly coated with the sulfite liquor provided sufficient of the latter be present to secure the required bonding effect.

Although the reaction takes place readily in the cold with the lime reagent as above, heat may be employed if desired to modify the reaction. When precipitants other than lime are used the conditions should be adjusted to meet any modification of the reaction under the circumstances. Similarly although the process is described more particularly with reference to the production of briquets it will now be evident that the reaction may be applied to other fields where it is desired to precipitate sulfite liquor to yield an insoluble product, especially as distinguished from "salting out" procedures known in the art. Thus flooring, tool handles, blocks, and all kinds of molded products may be obtained.

For convenient shipment and for certain other reasons including readiness with which the material may be incorporated with the coal or similar stock, the sulfite liquor may be dried to a solid and ground to a powder or dried in an atomizing system which yields the material in a pulverulent condition. This powder is then mixed with the coal, lime being added before or after or with such mixture, and water incorporated so as to cause the reaction either in the bulk mass or after forming into briquets.

Similarly a pulverulent product consisting of a mixture of the dry sulfite liquor solids and hydrated lime may be prepared for use as a binder.

Other precipitants than lime may be employed as stated. Preferably however a basic body such as lime or barium hydrate is recommended and preferably with the acid sulfite of cellulose waste liquor, it being desirable to have only a moderate degree of acidity to permit of the reaction taking place with effectiveness.

Barium hydrate is not a powerful precipitant as calcium hydrate, on some liquors. Lime is a specific precipitant. Another consideration is that in the case of briquets it becomes necessary to consider the ash of the fuel. Any addition of sulfur compounds such as pyrite is of course regarded as objectionable, while lime is even advantageous as it softens the clinker rendering same less likely to freeze to the stove fire box or grates. With 6% of sulfite liquor and 3% of lime the resulting ash is not objectionable in the case of most grades of coal, both anthracite and bituminous.

It has been noted by Pollacsek (German Patent 100,550) that sulfite waste liquor could be used as a binding material for making briquets but that the application of concentrated sulfite waste liquor in this manner had certain disadvantages, among which was the cost of concentration. He therefore made use of the crude cellulose sulfite waste liquor without any treatment whatsoever, and claimed the advantage of eliminating the cost of concentration and of purification. He states that he uses the crude liquor without any purification, which is mixed with fragments of coal or turf, with the addition of a small amount of lime and magnesia. He recommends 1 part of the crude liquor to 5 parts of coal fragments, to which is added about 1% of quick lime and $\frac{1}{2}$% magnesia, calculated on the weight of the mixture. There is no suggestion by him of carrying out the operation to produce a coagulated sulfite liquor acting as a waterproof or weather-proof binder and furthermore there is the disadvantage in his method that the treatment of more or less porous material with the liquor in its crude state causes a considerable amount to be taken up by capillary spaces and rendered useless at the surfaces where binding is required, so that the binding effect is not satisfactory as it should be. Another point is that the crude sulfite waste liquor contains acid material including sulfurous acid, which if not completely neutralized by the lime employed would tend to oxidize to sulfuric acid and have a disintegrating action. The presence in the composition of sulfites changing to sulfates with more or less expansion and change in hydration is undesirable. In the present invention the concentrated liquor employed may be of such a viscosity or consistency as not to penetrate into the capillary spaces but to largely remain at the contacting surfaces of the bulking material so as to act as a binder of high efficiency. In the process of concentration the free sulfurous acid is expelled and by my method of neutralization as indicated above in a preferred form, a substantial to major portion of any acids or acid compounds are neutralized to a large extent so that as evaporation progresses under such conditions a form of the sulfite waste liquor solids is obtained which is readily coagulable and more effective than the stable solids of the crude product. The use of 50% or so of lime based on the amount of the concentrated sulfite cellulose liquor employed in the briquet enables a neutral to alkaline reaction to be obtained so that the equilibrium of the acid composition is upset and a satisfactory precipitation and coagulation of the solids ensues in the briquet.

A very satisfactory method of freeing the sulfite liquor from free sulfurous acid is that of concentrating to a thin syrup in a vacuum pan or any other suitable manner and in atomizing the syrup with heated air to produce a dried pulverulent atomized solid material which has a very stable character but which reacts in the presence of moisture and heat especially when rendered alkaline by lime and the like to form a coagulated product such as is referred to above. A binding material of this character is described in my co-pending application Serial No. 779,516. A briquet may be made from such atomized composition by admixing 3 to 6% of this pulverulent material with coal fragments, adding water and a small amount of hydrate of lime to secure an alkaline reaction, in briqueting and heating to form a soluble product, and one feature of the present invention is the use of such atomized dried cellulose sulfite waste liquor solid in combination with a bulking agent such as coal fragments, iron ore or other mineral matter and the like to form a molded mass such as a briquet and in insolubilizing the binding agent to produce a substantially waterproof or weatherproof mass capable of resisting the effect of weather and moisture under such conditions as would normally be required of fuel briquets and the like.

As I have stated in Serial No. 779,516 waste sulfite cellulose liquor solids in the form of a powder or granular fragmental material or in paste form may be prepared in such condition as to be readily soluble in water so that the dried stock material may be reduced or dissolved in water to make a solution of the desired density and viscosity at the time of use. The concentrated sulfite cellulose liquor of, say a gravity of 30° Bé. as such is a fairly stable composition but being dried to a solid material such as a powder, is likely to undergo undesirable changes which would render it insoluble or prone to become insoluble in storage. By employing the method described herein a product is obtained which is of a dry, fragmental or pulverulent character of such stability that it may be packed in slack cooperage, such as flour barrels which are pervious to air and in this condition may be stored in such air-pervious packages for an indefinite period without becoming insoluble to any material extent or becoming sticky and agglutinated even in air containing a fair amount of humidity. In the preferred form of the present invention a pulverulent product is used which shows quite a marked resistance to atmospheric influences, as for example, when a fine powder of ordinary dried solids of sulfite liquor is exposed in thin layers to air, in a short time it tends to become rather sticky and gummy, while in the present case the pulverulent material in the preferred form is more resistant under like test and yet is of a sufficiently unstable nature to be suitably coagulated when heated in a briquet under normal coagulating conditions.

The addition to the sulfite liquor of a compound such as silicate of soda may be made to assist in the binding action and in the coagulation by heating. The change in the composition of the sulfite liquor material by the addition of silicate of soda usually is not immediate at first but on standing reaction takes place and especially if the material is used in a briquet the coagulating and binding effect becomes quite apparent. The addition of 10 to 15% of petroleum oil such as asphaltic oil may also be made along with the sulfite liquor in preparing a waterproof briquet and even in some cases 3 to 5% of oil may be employed and 1% or so of calcium stearate.

In the manufacture of briquets from culm or similar mineral material the dry binder of the character particularly specified may be merely incorporated with the dry material and the mixture afterward wetted and pressed into shape, or a solution may be prepared from the dry product which is useful because of its ease of admixture and in the preferred form of the invention a solid binder is used which has considerably less viscosity, usually from 10 to 50% less viscosity than ordinary sulfite cellulose waste liquor, which has been merely concentrated to that point without having previously been dried and then diluted with water. Hence there is an advantage in some cases in concentrating the liquor, drying to a solid form by atomization with hot air or hot gases or by any other suitable method of drying and then dissolving this solution in water because thereby a solution of higher strength is better obtained for a given viscosity in the preferred form of the present invention and this is quite frequently of advantage in connection with the problem of briqueting bulking material of a variety of characteristics. In some cases briquets or other products prepared from such dried solids of the sulfite waste liquor of less viscosity show fewer hair lines or cracks and greater resistance to atmospheric or mechanical erosion.

Finally in recapitulation it should be stated that although I lay claim broadly to the novel reaction hereinbefore set forth, I principally indicate concentrated acid sulfite liquor diluted as may be desired, as a binding material, preferably precipitated by means of the specific precipitant quicklime or lime material, as calcium saccharate and the like, such acid sulfite liquor being preferably in a colloidal and unstable form due to such concentration under these conditions so that the act of neutralization or over-neutralization (an excess of precipitating agent being preferably employed) induces not merely chemical combination but a polymerization or some similar form of coagulation the exact nature of which I do not herein attempt to describe. While lime exerts this effect calcium chlorid does not yield the same results. Probably the removal of the excess of sulfite liquor and possibly some in combination with the solids of the liquor, which occurs during the treatment connected with concentration, places the solids or some of them in an unstable condition and the addition of the lime by further combination under these peculiar conditions causes the effects observed. The bulking agent or material hereinafter mentioned is the material employed as the filler or the essential material to be bound together as aforesaid.

From the foregoing it will be readily understood that, by the concentration of waste sulfite liquor, the product is rendered substantially free from sulfurous acid so that the action of sulfurous acid on the added lime is avoided, and sulfur, which is objectionable in briquets, is reduced to a minimum. It will also be readily understood from the foregoing description that, by reason of the chemical reactions which take place during concentration, the constituents of the sulfite liquor which are better acted upon by a reagent such as lime, in my process, are in a chemically unstable condition as compared with their condition in unconcentrated sulfite liquor so that, upon the addition of lime the desired reactions take place in an effective manner, especially when the mass is heated.

The foregoing description of details of procedure is given for illustrative purposes and without any intention of imposing limitations on the scope of the present invention other than that expressed by the subjoined claims.

Reference is made herein to my co-pending application Serial No. 165,441, in which I have disclosed certain methods of preparing and utilizing dried sulfite cellulose waste liquor solids such as may be prepared by atomization and I do not make claim herein to the subject matter of said co-pending application, as the present invention primarily relates to the matter particularly described in the first paragraph of this specification.

What I claim is: —

1. The process of making briquets or other molded articles which comprises incorporating a bulking material and a binding agent comprising a solution prepared by dissolution in an aqueous medium of atomized dried water-soluble solids of sulfite cellulose waste liquor, in forming into shaped masses and in insolubilizing said water-soluble solids; whereby a substantially weather-resistant briquet or other molded article is obtained.

2. In the process of making briquets or other molded articles, the step which comprises incorporating a bulking material and a binding agent comprising a solution of atomized dried water-soluble solids of sulfite cellulose waste liquor.

3. The process of making briquets or other molded articles which consists in incorporating a binding agent comprising a solution made from concentrated dried atomized acid sulfite cellulose waste liquor solids of a substantially water-soluble character with a bulking material and a substance capable of slowly reacting with said solids to form a substantially insoluble product, in molding under pressure into masses of definite shape prior to any material transformation of the solids to a substantially insoluble product and in permitting reaction to take place with formation of said substantially insoluble product.

4. The process of making briquets or other molded articles which consists in incorporating a binding agent comprising a solution prepared by dissolution in an aqueous medium of atomized concentrated acid sulfite cellulose waste liquor solids of a substantially water-soluble character with a bulking material and an alkali to give an alkaline reaction, in molding under pressure into masses of definte shape and in transforming said soluble solids into a substantially insoluble product.

5. The process of making briquets or other molded articles which comprises incorporating a binding agent comprising a solution prepared by dissolution in an aqueous medium of atomized concentrated acid sulfite cellulose waste liquor solids of a substantially water-soluble character with coal fragments.

6. The process of making briquets or other molded articles which consists in incorporating a binding agent comprising a solution prepared by dissolution in water of dried atomized concentrated sulfite cellulose waste liquor solids of a substantially water-soluble character with lime and a bulking material, in molding under pressure into masses of definite shape and in transforming said soluble solids into a substantially insoluble product.

7. The process of making briquets or other molded articles which consists in incorporating a binding agent comprising a diluted solution of previously concentrated sulfite cellulose waste liquor solids in a water-soluble condition with a bulking material, in molding the mass and in coagulating the water-soluble solids.

8. The process of making briquets or other molded articles which consists in incorporating a binding agent comprising a diluted solution of previously concentrated acid sulfite cellulose waste liquor solids in a water-soluble condition with bulking material, in molding the mass and in coagulating the water-soluble solids.

9. The process of making briquets or other molded articles which comprises incorporating a binding agent comprising a solution made by re-solution of dried acid sulfite cellulose waste liquor solids of a substantially water-soluble character with a bulking material, and in molding under pressure.

10. The process of making fuel briquets or other molded articles which comprises incorporating a bulking material with a binding agent comprising an aqueous solution made by diluting pulverulent acid sulfite cellulose waste liquor solids of a substantially water-soluble character, in molding under pressure into masses of definite shape before final setting has taken place and in permitting such final setting to take place in the molded mass.

11. The process of making briquets or other molded articles which comprises incorporating a solution made from dried pulverulent solids of acid sulfite cellulose waste liquor with a bulking material, and a precipitating agent, in molding the mass and in heating to modify the reaction of coagulation of the waste liquor solids.

12. The process of making briquets or other molded articles which comprises incorporating a bulking material with a solution made from dried solids of acid sulfite cellulose waste liquor, in molding the mass and in heating to modify the setting of the waste liquor solids.

13. The process of making briquets or other molded articles which comprises incorporating a bulking material with an aqueous solution made from solids of dried atomized acid sulfite cellulose waste liquor, in molding the mass and in heating to modify the setting of the waste liquor solids.

14. The process of making fuel briquets or other molded articles which comprises incorporating a bulking material with an aqueous solution made by diluting dried acid sulfite cellulose waste liquor concentrate, a precipitating agent comprising lime and moisture, in molding the mass and in heating to modify the reaction of coagulation of the waste liquor solids.

15. In the manufacture of briquets the step which comprises incorporating a bulking agent and a solution of sulfite cellulose waste liquor solids dried by atomization.

16. In the manufacture of briquets the step which comprises incorporating coal fragments with a solution made from sulfite cellulose waste liquor solids dried by atomization.

17. In the manufacture of briquets the step which comprises incorporating a bulking agent with a solution made from acid sulfite cellulose waste liquor solids dried by atomization.

18. As a new product, a mass of bulking material bound by coagulated sulfite cellulose waste liquor solids coagulated from a solution of a concentrate of such solids.

CARLETON ELLIS.